United States Patent

Gale et al.

(12)

(10) Patent No.: US 6,304,056 B1
(45) Date of Patent: Oct. 16, 2001

(54) PULSED CHARGE POWER DELIVERY CIRCUIT FOR A VEHICLE HAVING A COMBINED STARTER/ALTERNATOR

(75) Inventors: Allan Roy Gale, Livonia; Michael W Degner, Farmington Hills, both of MI (US); Michael Alan Tamor, Toledo, OH (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/667,187

(22) Filed: Sep. 21, 2000

(51) Int. Cl.[7] .......................... H01M 10/44; H01M 10/46
(52) U.S. Cl. ............................................................. 320/104
(58) Field of Search ..................................... 320/103, 104, 320/110, 127, 128

(56) References Cited

U.S. PATENT DOCUMENTS

| | | |
|---|---|---|
| 4,720,638 | 1/1988 | Vollbrecht . |
| 4,916,345 | 4/1990 | Tong . |
| 5,001,412 | 3/1991 | Carter et al. . |
| 5,097,140 | 3/1992 | Crall . |
| 5,146,095 | 9/1992 | Tsuchiya et al. . |
| 5,155,374 | 10/1992 | Shirata et al. . |
| 5,157,267 | 10/1992 | Shirata et al. . |
| 5,254,929 * | 10/1993 | Yang ..................................... 320/103 |
| 5,260,637 * | 11/1993 | Pizzi ..................................... 320/103 |
| 5,285,862 | 2/1994 | Furutani et al. . |
| 5,350,994 | 9/1994 | Kinoshita et al. . |
| 5,469,820 | 11/1995 | Data et al. . |
| 5,677,614 * | 10/1997 | Ohmori et al. ....................... 320/103 |
| 5,705,859 | 1/1998 | Karg et al. . |
| 5,852,332 * | 12/1998 | Shearer .............................. 320/103 X |
| 5,925,938 | 7/1999 | Tamor . |
| 5,998,976 | 12/1999 | Steffan . |
| 6,049,185 | 4/2000 | Ikeda . |

* cited by examiner

Primary Examiner—Edward H. Tso
(74) Attorney, Agent, or Firm—Jennifer Stec

(57) ABSTRACT

A method of charging a primary energy storage device in a vehicle including a secondary energy storage device and an engine coupled to a combined starter/alternator. The method comprises the steps of operating the starter/alternator as a generator at approximately a peak efficiency value, and electrically connecting the starter/alternator and the secondary energy storage device for a first predetermined period of time such that the starter/alternator charges the secondary energy storage device. Once the secondary energy storage device reaches a desired charge value, the starter/alternator and the secondary energy storage device are disconnected. The method also electrically connects the primary and secondary energy storage devices such that the secondary energy storage device charges the primary energy storage device. This continues until the charge on the secondary energy storage device reaches a minimum charge value, at which time, the starter/alternator is again operated at a peak efficiency value and connected to the secondary energy storage device. In this way, the starter/alternator pulse-charges the secondary energy storage device which, in turn, maintains the desired charge on the primary energy storage device.

11 Claims, 2 Drawing Sheets

PULSED CHARGE POWER DELIVERY CIRCUIT FOR A VEHICLE HAVING A COMBINED STARTER/ALTERNATOR

CROSS REFERENCE TO RELATED APPLICATIONS

This application is related to co-pending U.S. Patent application Ser. No. 09/667,196 entitled "Pulsed Charge Starter/Alternator Control System" filed Sep. 21, 2000 and U.S. Patent Application Ser. No. 09/666,582 entitled "Power Delivery Circuit With Boost For Energetic Starting In A Pulsed Charge Starter/Alternator System" filed Sep. 21, 2000 both of which are incorporated herein by reference and commonly owned by the assignee of the present invention.

BACKGROUND

The present invention relates to electrical systems for motor vehicles and more particularly, to a pulsed charge power delivery circuit for a vehicle having a combined starter/alternator.

Combined starter/alternators such as those known in the art are disclosed in U.S. Pat. Nos. 4,720,638; 4,916,345; 5,001,412; 5,097,140 and 5,469,820. A combined starter/alternator as used in a motor vehicle can be used as a motor to crank and start the engine as well as a generator to provide electrical power to the vehicle electrical systems. When operated as a starter motor, the starter/alternator is supplied with current from the battery and is operated to rotate the engine crankshaft. The engine crankshaft is rotated until the engine fires and continues to run on its own power. When used as a generator, the running engine is coupled to the starter/alternator which, in turn, produces a three-phase output that is rectified to a steady state DC output that is used to maintain the charge on the vehicle energy storage device to meet the vehicle electrical load requirements.

When operating as a generator, the efficiency of the starter/alternator is defined as the ratio of the input power to the output power. Such generators have both fixed and variable losses. Some of these losses are associated with the switching circuitry such as the inverter used to rectify the output of the generator. There are three primary classifications of losses: mechanical losses, electrical losses, and magnetic losses. Mechanical losses are primarily due to the rotation of the rotor and include bearing friction loss and windage loss. Magnetic losses include eddy current-current loss and hysteresis loss. All of these losses can be grouped into two categories, namely, fixed losses and variable losses. Fixed losses are losses that do not change with load when the machine is operating at a known speed. Therefore, rotational losses are one part of fixed losses. In the case of a wound field machine where the field current is required to set up the required flux in the machine, the power supplied to the field lining is also considered a fixed loss. On the other hand, variable losses are losses that vary with the load current. All of the copper or resistive losses are included in this category. Since the losses associated with the starter/alternator when operating as a generator are only partially load dependent, the system exhibits low efficiencies at low power levels. At higher output power levels, the output power rises relative to the losses and correspondingly, the system efficiency rises as well. This continues up to a peak efficiency torque point whereafter additional torque input into the generator does not result in a significant increase in power output and, hence, the efficiency falls off.

It has been found that operating a starter/alternator at a continuous power output approximately equal to the vehicle electrical load demand such as 500 W is a low efficiency output for a typical starter/alternator. Accordingly, there is a need for a starter/alternator control system having increased efficiency.

SUMMARY OF THE INVENTION

It is therefore an object of the present invention to provide an improved pulsed charge power delivery circuit for a starter/alternator system. It is another object of the invention to provide a pulsed charge power delivery circuit for a starter/alternator system having improved efficiency.

According to the present invention, the foregoing and other objects are attained by a method of charging a primary energy storage device in a vehicle including a secondary energy storage device and an engine coupled to a combined starter/alternator. The method comprises the steps of operating the starter/alternator as a generator at approximately a peak efficiency value, and electrically connecting the starter/alternator and the secondary energy storage device for a first predetermined period of time such that the starter/alternator charges the secondary energy storage device. Once the secondary energy storage device reaches a desired charge value, the starter/alternator and the secondary energy storage device are disconnected. The method also electrically connects the primary and secondary energy storage devices such that the secondary energy storage device charges the primary energy storage device. This continues until the charge on the secondary energy storage device reaches a minimum charge value, at which time, the starter/alternator is again operated at a peak efficiency value and connected to the secondary energy storage device. In this way, the starter/alternator pulse-charges the secondary energy storage device which, in turn, maintains the desired charge on the primary energy storage device. Alternatively, the primary and secondary energy storage devices can be continuously electrically connected.

One advantage of the present invention is that it has improved efficiency as compared to conventional starter/alternator charging systems. Other objects and advantages of the invention will become apparent upon reading the following detailed description and appended claims, and upon reference to the accompanying drawings.

BRIEF DESCRIPTION OF THE DRAWINGS

For a more complete understanding of this invention, reference should be made to the embodiments illustrated in greater detail in the accompanying drawings and described below by way of examples of the invention.

In the drawings.

DESCRIPTION OF THE PREFERRED EMBODIMENT

Figure 1:
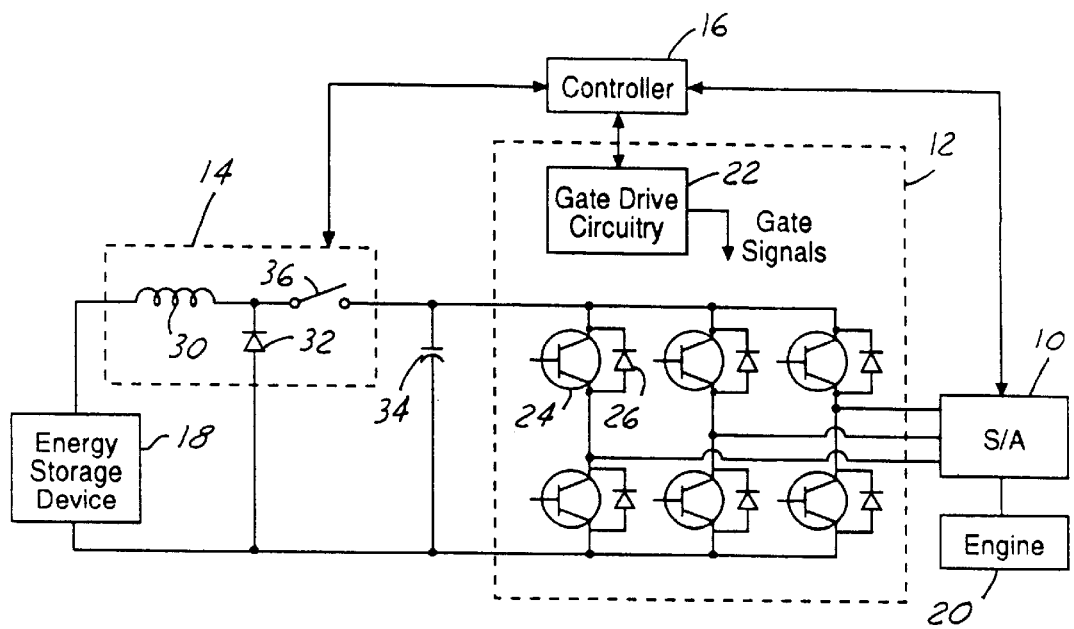
FIG. 1 is a schematic block diagram of one embodiment of the pulsed charge power delivery circuit for a starter/alternator system according to the present invention.

Referring now to FIG. 1, there is shown a schematic block diagram of a pulsed charge power delivery circuit according to one embodiment of the present invention. The pulsed charge power delivery circuit includes a combined starter/alternator 10, inverter 12, a down converter 14, and a controller 16 which are used to maintain a charge on an energy storage device 18 such as the vehicle battery. The combined starter/alternator 10 is coupled to the vehicle engine 20 and can be any known combined starter/alternator.

When operating as a starter motor, the starter/alternator 10 receives charge from the energy storage device 18 and functions to crank the engine 20 until the engine 20 is running. When operating as an alternator or generator, the starter/alternator 10 is coupled to the running engine 20 and produces a three-phase output which is converted by inverter 12 to a steady state DC output which is used to maintain the charge on the energy storage device 18. The energy storage device 18 may be a battery, a capacitor, or both. Energy storage device 18, in turn, is used to provide power to meet the vehicle electrical load demand of the vehicle subsystems such as the ignition system, lighting system, instrument panel and convenience features.

The inverter 12 is operated by the controller 16 by way of gate drive circuitry 22 to provide steady state DC output from the starter/alternator 10 when operating as a generator. The three-phase output of the starter/alternator 10 is electrically coupled to a plurality of switches 24 and a plurality of fly back diodes 26, each of which are connected in reverse polarity and in parallel with each of the power switches 24 in the inverter circuit 12. The switches 24 are preferably metal oxide silicon field effect transistors (MOSFETs) or integrated gate bipolar transistors (IGBTs) or any other conventional power switching device.

The controller 16 is preferably a digital signal processor (DSP). The controller 16 can be a dedicated controller to operate the inverter 12 or alternatively, as shown in FIG. 1, it can provide multiple functions by controlling the down converter 14 and/or the starter/alternator 10 as well. The controller 16 may also be part of the engine controller (not shown). In such cases, the controller 16 would include a central processing unit such as a microprocessor, inputs and outputs, and associated memory such as random access memory and read-only memory.

The down converter 14 comprises an inductor 30, diode 32, DC bus capacitor 34, and a switch 36. The DC bus capacitor 34 is used to provide charge to the energy storage device 18 when the switch 36 is closed. As described above, it is preferable to operate the starter/alternator 10 at higher loads when operating as a generator to increase the efficiency of the starter/alternator 10. Accordingly, the inverter 12 intermittently periodically electrically couples the output of the starter/alternator 10 to the DC bus capacitor 34 to charge the capacitor 34. The capacitor 34, in turn, is used to charge the energy storage device 18 by way of the switch 36. The switch 36 is also preferably a MOSFET or IGBT which is activated at a high frequency to electrically couple the capacitor 34 and energy storage device 18. The switch 36 can be either continuously or intermittently activated.

Figure 2:
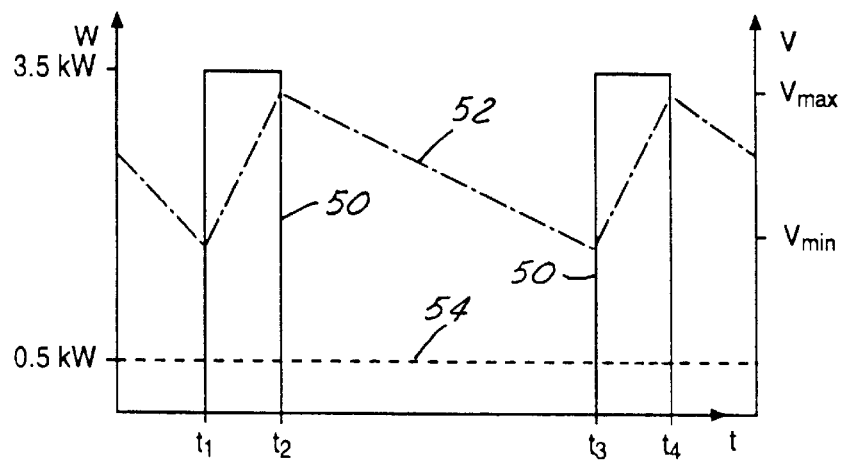
FIG. 2 is a graph of the operation of the pulsed charge power delivery circuit of FIG. 1.

Referring now to FIG. 2, there is shown a graph of the operation of the pulsed charge power delivery circuit of FIG. 1. In operation, the inverter drive is enabled by the controller 16 to allow the starter/alternator 10 to charge the capacitor 34 to a maximum voltage, $V_{max}$. The inverter drive is then disabled by the controller 16 and the switch 36 of the down converter 14 is activated to let the converter comprising inductor 30, diode 32, and switch 36 to supply constant power to the energy storage device 18 until the capacitor 34 reaches a minimum voltage, $V_{min}$. At this point, the process is repeated. In the example shown in FIG. 2, the output of the starter/alternator is shown as pulses 50, and the voltage across the capacitor 34 is shown as line 52.

In the example of FIG. 2, it is assumed that the energy storage device 18 is used to supply a constant 0.5 kW power to meet the vehicle electrical load demands. This electrical load demand is shown as line 54 in FIG. 2. The peak efficiency torque of the particular starter/alternator results in an output of 3.5 kW. Of course, this power output at the peak efficiency point will vary for the particular starter/alternator under consideration. The starter/alternator is then pulsed on from time $t_1$ to $t_2$ to charge the capacitor 34 from $V_{min}$ to $V_{max}$. At this point, the starter/alternator and/or the inverter drive circuit 12 is disengaged and the capacitor 34 is allowed to decay from $V_{max}$ to $V_{min}$ as power is drained from the capacitor 34 by the energy storage device 18. At time $t_3$, when the capacitor voltage reaches $V_{min}$, the starter/alternator 10 is again electrically coupled to the capacitor 34 at a high efficiency operating point until the capacitor 34 reaches its desired charge value of $V_{max}$. The pulse is then terminated at time $t_4$.

As can be seen in FIG. 2, if the starter/alternator 10 were merely operated to output a continuous 0.5 kW to maintain the charge on the capacitor 34 and corresponding energy storage device 18 to meet the vehicle electrical load demand of 0.5 kW, the overall system efficiency would be lower. For the particular starter/alternator under consideration, it was observed that a continuous 0.5 kW system output power resulted in a starter/alternator efficiency of approximately 55%. The same system operated in the pulsed power mode, as shown in FIG. 2, however, had a system efficiency of approximately 84%. Thus, the method of the present invention resulted in a 52% improvement in the overall system efficiency.

In example shown, the assumed operating range of the capacitor 34 is between the rated voltage $V_{max}$ and one-half the rated operating voltage $V_{min}$. For such a design, the energy stored in the capacitor for use in supplying the energy to the storage device 18 is then $(3/8)CV^2$. Assuming a 400 volt energy storage device 18, a 0.5 kW load, and 3 kW pulsed charge rate, the capacitor 34 would need to be 0.5 Farads to provide a 10 second charge time ($t_1$ to $t_2$) at 3 kW and a 60 second discharge time ($t_2$ to $t_3$) at 0.5 kW. Of course, the discharge time will decrease, i.e., the rate of discharge will increase, as the load power requirement increases or if the capacitor 34 were made smaller. In this example, the 10 second charge time ($t_1$ to $t_2$) was selected to be greater than 10 times the starter/alternator rotor time constant which is defined as the time necessary to reach 63% of the desired flux for operating the starter/alternator as a generator at the desired efficiency level. Of course, the relationship to the rotor time constant can be selected as any other appropriate value. Again, the pulse width magnitude and frequency will depend upon the particular starter/alternator under consideration as well as the energy storage device characteristics, capacitor size, and vehicle electrical load demands. Although the preferred embodiment of the present invention includes the capacitor 34 as the secondary energy storage device for charging primary energy storage device 18, it is to be understood that the capacitor 34 could also be replaced by other energy storage devices such as a battery or a combination battery and capacitor.

Figure 3:
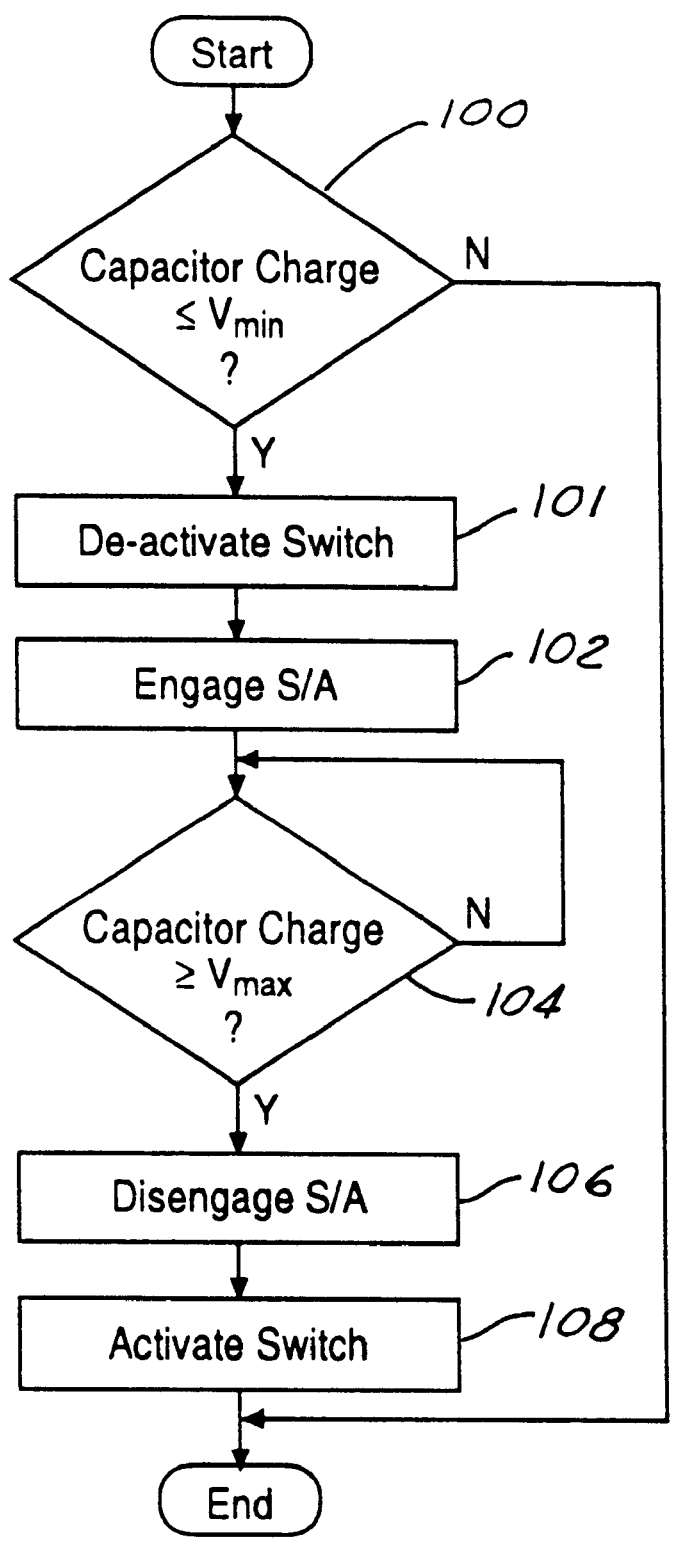
FIG. 3 is a logic flow diagram of one method of operating the pulsed charge power delivery circuit of the present invention.

Referring now to FIG. 3, there is shown a logic flow diagram of one method of operating the pulsed charge power delivery circuit of FIG. 1 according to the present invention. The logic routine shown in FIG. 3 resides in the controller 16 and is preferably continuously executed. The method begins in step 100 by monitoring the charge across the secondary energy storage device or capacitor 34 of FIG. 1 which is supplying energy to the primary energy storage device 18 to meet the vehicle electrical load. When the capacitor charge has reached $V_{min}$, preferably the switch 36 of converter 14 is de-activated in step 101 to disengage the capacitor 34 from the energy storage device 18. Alternatively, the switching circuit 36 can remain activated to maintain the electrical connection between the capacitor 34 and primary energy storage device 18 while the capacitor 34 is being charged by the starter/alternator. At about the same time, the starter/alternator is engaged in step 102 by way of the inverter 12 and associated switching circuitry 22, 24 and 26 to charge the capacitor 34 until it has reached the desired $V_{max}$ in step 104. Once the capacitor charge has reached the desired $V_{max}$, the starter/alternator and/or inverter 12 is deactivated in step 106 and the switch 36 of converter 14 is activated in step 108 to re-engage the capacitor 34 and the primary energy storage device 18 until such time when the capacitor charge is depleted to the predetermined $V_{min}$, and the process repeats. Alternatively, the down converter can be operated continuously.

Alternative methods of implementing the present invention are also contemplated. For example, rather than monitoring the capacitor charge, given the maximum vehicle electrical load, the capacitor size, and the output of the starter/alternator at the desired efficiency level, the times $t_1$, $t_2$, and $t_3$ defining the pulse period and the frequency can be determined. Accordingly, the control logic would comprise de-activating the switch, engaging the starter/alternator from time $t_1$ to $t_2$ to charge the capacitor, disengaging the starter/alternator, and activating the switch from time $t_2$ to $t_3$. The process is then repeated. Alternatively, the switch can be continuously activated. Preferably, however, the voltage across the capacitor 34 is monitored to determine the pulse on and off timing of the starter/alternator to improve the system efficiency. This is because it allows for variable pulse frequency. In other words, a fixed frequency system must assume full vehicle electrical load so as to prevent unnecessary drain on the energy storage device 18. By monitoring the capacitor charge, however, during light vehicle electrical load situations, the time between pulsed operation of the starter/alternator ($t_2$ to $t_3$) can be increased due to a lower depletion rate on the capacitor 34. As a further alternative, the voltage across the primary energy storage device 18 could be monitored and the capacitor 34 charged accordingly to maintain the desired level of charge across the primary energy storage device 18.

Another advantage of monitoring the capacitor voltage to determine the pulse width and frequency of the charging circuit is that it allows the starter/alternator to be operated at different power levels should it be desired to do so. For example, when operating as a generator, the starter/alternator peak efficiency may occur at a load of 20 Nm. Accordingly, to operate the starter/alternator at the desired peak efficiency, the engine must produce an additional 20 Nm output to drive the starter/alternator. If the demand on the engine is such that it would be undesirable for the engine to produce an additional 20 Nm of torque to operate the starter/alternator at its peak efficiency, a lower additional output torque value and correspondingly lower output torque of the starter alternator may result. In such cases, the charge time of the capacitor ($t_1$ to $t_2$) would also increase due to the lower charging voltage across the capacitor.

From the foregoing discussion, it can be seen that there has been brought to the art a new and improved pulsed charge power delivery circuit for a vehicle having a combined starter/alternator system. While the invention has been described in connection with one or more embodiments, it should be understood that the invention is not limited to those embodiments. On the contrary, the invention covers all alternatives, modifications, and equivalents as may be included within the spirit and scope of the appended claims.

What is claimed is:

1. A method of charging a primary energy storage device in a vehicle including a secondary energy storage device and an engine coupled to a combined starter/alternator, the method comprising the steps of:

operating said starter/alternator as a generator at approximately a peak efficiency value;

electrically coupling said starter/alternator and said secondary energy storage device for a first predetermined period of time such that said starter/alternator charges said secondary energy storage device;

disconnecting said starter/alternator and said secondary energy storage device; and, electrically connecting said primary and secondary energy storage devices for a second predetermined period of time such that said secondary energy storage device charges said primary energy storage device.

2. The method of claim 1, further comprising the steps of:

monitoring a charge value on said secondary energy storage device;

electrically coupling said starter/alternator and said secondary energy storage when said charge value is less than a minimum charge value;

disconnecting said starter/alternator and said secondary energy storage device when said charge value is greater than a maximum charge value.

3. The method of claim 2 further comprising the step of disconnecting said primary and secondary energy storage devices when said charge value is less than a minimum charge value.

4. The method of claim 2 wherein the step of disconnecting said starter/alternator and said secondary energy storage device includes the step of de-activating said inverter switching circuit.

5. The method of claim 3 wherein the step of disconnecting said primary and secondary energy storage devices includes the step of de-activating a converter switching circuit.

6. The method of claim 1 wherein the step of electrically connecting said starter/alternator and said secondary energy storage device includes the step of activating an inverter switching circuit.

7. The method of claim 1 wherein the step of electrically connecting said primary and secondary energy storage devices includes the step of activating a converter switching circuit.

8. The method of claim 1 further comprising the steps of:

monitoring a charge value on said primary energy storage device;

electrically connecting said starter/alternator and said secondary energy storage when said charge value is less than a minimum charge value;

disconnecting said starter/alternator and said secondary energy storage device when said charge value is greater than a maximum charge value.

9. A power delivery system for a vehicle including an engine and combined starter/alternator, the system comprising:

a primary energy storage device;

a secondary energy storage device;

a converter for electrically connecting said primary and secondary energy storage devices;

an inverter switching circuit for electrically connecting said starter/alternator and said secondary energy storage device; and a controller programmed to perform the following steps:

monitor a charge value on said secondary energy storage device;

electrically connect said starter/alternator operating at approximately a peak efficiency value and said secondary energy storage when said charge value is less than a minimum charge value;

disconnect said starter/alternator and said secondary energy storage device when said charge value is greater than a maximum charge value; and, electrically connect said primary and secondary energy storage devices for a predetermined period of time such that said secondary energy storage device charges said primary energy storage device.

10. The system of claim 9 wherein said controller is further programmed to disconnect said primary and secondary energy storage devices when said charge value is less than a minimum charge value.

11. The system of claim 9 wherein said primary energy storage device is a battery and said secondary energy storage device is a capacitor.

* * * * *